(12) United States Patent
Kenyon et al.

(10) Patent No.: US 10,590,849 B2
(45) Date of Patent: Mar. 17, 2020

(54) HIGH SPEED PROPULSION SYSTEM WITH INLET COOLING

(71) Applicant: General Electric Company, Schenectady, NY (US)

(72) Inventors: Ross Hartley Kenyon, McMinnville, TN (US); Narendra Digamber Joshi, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 568 days.

(21) Appl. No.: 14/663,871

(22) Filed: Mar. 20, 2015

(65) Prior Publication Data

US 2015/0275762 A1  Oct. 1, 2015

Related U.S. Application Data

(60) Provisional application No. 61/971,336, filed on Mar. 27, 2014.

(51) Int. Cl.
*F02C 1/00* (2006.01)
*F02C 7/14* (2006.01)
(Continued)

(52) U.S. Cl.
CPC .............. *F02C 7/14* (2013.01); *F01D 13/003* (2013.01); *F01D 13/02* (2013.01); *F02C 3/305* (2013.01);
(Continued)

(58) Field of Classification Search
CPC .... F02C 7/14; F02C 7/143; F02C 7/16; F02C 7/224; F02C 6/00; F02C 3/073;
(Continued)

(56) References Cited

U.S. PATENT DOCUMENTS 3,812,672 A * 5/1974 Escher ...................... F02K 7/16
60/244
3,938,328 A * 2/1976 Klees ........................ F02K 3/04
60/224

(Continued)

OTHER PUBLICATIONS

Sobczak, Blake, Could natural gas fuel commercial flgiths of the future?, Aug. 26, 2013, EnergyWire.*
(Continued)

*Primary Examiner* — Craig Kim
*Assistant Examiner* — Edwin Kang
(74) *Attorney, Agent, or Firm* — Dority & Manning, P.A.

(57) ABSTRACT

A cooling system for a turbine engine including a heat exchanger in fluid communication with a first fluid inlet stream and disposed upstream and in fluid communication with a core engine. The heat exchanger operative to cool the first fluid inlet stream. The heat exchanger including a heat exchanger inlet for input of a heat exchanging medium for exchange of heat from the first fluid inlet stream to the heat exchanging medium. The heat exchanger further including a heat exchanger outlet for discharge of a heated output stream into one of a turbine of a downstream engine, an augmentor or a combustor of the core engine. The heated output stream provides an additional flow to the downstream engine. A turbine engine including the cooling system is disclosed.

10 Claims, 7 Drawing Sheets

(51) Int. Cl.
| | |
|---|---|
| *F02C 7/16* | (2006.01) |
| *F02C 9/18* | (2006.01) |
| *F02C 7/143* | (2006.01) |
| *F02C 3/30* | (2006.01) |
| *F02C 6/00* | (2006.01) |
| *F02K 3/11* | (2006.01) |
| *F02K 3/075* | (2006.01) |
| *F02K 7/14* | (2006.01) |
| *F02K 3/10* | (2006.01) |
| *F01D 13/02* | (2006.01) |
| *F01D 13/00* | (2006.01) |
| *F01D 25/12* | (2006.01) |

(52) U.S. Cl.
CPC ............... *F02C 6/00* (2013.01); *F02C 7/143* (2013.01); *F02C 7/16* (2013.01); *F02C 9/18* (2013.01); *F02K 3/075* (2013.01); *F02K 3/10* (2013.01); *F02K 3/11* (2013.01); *F02K 7/14* (2013.01); *F01D 25/12* (2013.01); *F05D 2220/323* (2013.01); *F05D 2220/80* (2013.01); *F05D 2260/213* (2013.01); *Y02T 50/675* (2013.01)

(58) Field of Classification Search
CPC ... F01D 13/02; F02K 3/10; F02K 3/11; F02K 7/14; F02K 7/16; F05D 2220/80; F05D 2260/213; F05D 2260/232
See application file for complete search history.

(56) References Cited

U.S. PATENT DOCUMENTS

| | | | | |
|---|---|---|---|---|
| 4,765,142 A | * | 8/1988 | Nakhamkin | F01K 21/047 60/652 |
| 6,012,279 A | * | 1/2000 | Hines | F02C 7/1435 60/39.53 |
| 6,467,252 B1 | * | 10/2002 | Payling | F01K 21/047 60/39.53 |
| 6,895,756 B2 | * | 5/2005 | Schmotolocha | F02K 3/10 60/749 |
| 7,137,255 B2 | * | 11/2006 | Schmotolocha | F02K 3/10 60/761 |
| 7,266,946 B2 | * | 9/2007 | Fletcher | F02C 3/22 60/728 |
| 7,284,377 B2 | * | 10/2007 | Joshi | F02C 3/305 60/39.55 |
| 7,963,100 B2 | | 6/2011 | Bakos et al. | |
| 2004/0050061 A1 | * | 3/2004 | Schmotolocha | F02K 3/10 60/761 |
| 2005/0126179 A1 | * | 6/2005 | Fletcher | F02C 3/22 60/776 |
| 2005/0262848 A1 | * | 12/2005 | Joshi | F02C 3/305 60/772 |
| 2007/0144176 A1 | * | 6/2007 | Joshi | F02C 7/143 60/728 |
| 2012/0144843 A1 | | 6/2012 | Donovan et al. | |
| 2013/0000273 A1 | * | 1/2013 | Roberge | F02C 3/073 60/226.1 |

OTHER PUBLICATIONS

Sobczak, Blake, Could natural gas fuel commercial flights of the future, Aug. 26, 2013, EnergyWire.*

Balepin, Vladimir,. "High Speed Propulsion Cycles." Advances on Propulsion Technology for High Speed Aircraft NATO RTO-EN-AVT-150 (2008): 1-32.

* cited by examiner

HIGH SPEED PROPULSION SYSTEM WITH INLET COOLING

BACKGROUND

The present disclosure relates in general to turbine systems, and more particularly high-speed propulsion system and inlet cooling for such high-speed propulsion systems.

High-speed propulsion turbine systems are designed to facilitate supersonic and hypersonic air transport. For example, a conventional gas turbine system includes a compressor section, a combustor section, and at least one turbine section. The compressor section is configured to compress air as the air flows through the compressor section. The air is then flowed from the compressor section to the combustor section, where it is mixed with fuel and combusted, generating a hot gas flow. The hot gas flow is provided to the turbine section, which utilizes the hot gas flow by extracting energy from it to power the compressor, and create thrust by expelling these from the engine at high speeds.

One of the challenges of developing high-speed propulsion turbine system is managing the extreme stagnation conditions at the inlet during high speed flight. Traditional methods of approaching the problem include cocooning of the gas turbine engine and allowing the high temperature flow to bypass the turbomachinery and directly enter the combustion system. While cocooning at design speeds keeps the high temperature air out of the turbomachinery, the turbomachinery has to be designed to accommodate significantly higher air temperatures to allow the aircraft to accelerate to design speeds. This requires new, expensive high temperature alloys to be developed and a redesign of the turbomachinery to accommodate high temperatures.

Development costs for any high speed propulsion system are high and first time yield is low as most applications are built from a new centerline and limited opportunities exist for ground testing at representative conditions.

Accordingly a high speed propulsion turbine system that minimizes development and unit costs by leveraging existing engine technology, while providing a novel solution for inlet cooling and high-speed flight is desirable.

BRIEF DESCRIPTION

In accordance with one exemplary embodiment, a turbine engine including a cooling system is disclosed. The turbine engine including a core engine comprising an intake side and an exhaust side and configured to receive a first fluid stream and discharge an exhaust flow stream. The turbine engine further including a bypass flow turbomachine disposed to receive a second fluid stream and the exhaust flow stream from the core engine and discharge an exhaust flow stream. The bypass flow turbomachine including an augmentor. An inlet heat exchanger is in fluid communication with the first fluid stream and disposed upstream and in fluid communication with the core engine. The inlet heat exchanger is operative to cool the first fluid stream. The heat exchanger includes a heat exchanger inlet for input of a heat exchanging medium for exchange of heat from the first fluid stream to the heat exchanging medium and a heat exchanger outlet for discharge of a heated output stream. The heated output stream provides an additional flow into the bypass flow turbomachine.

In accordance with another embodiment, a cooling system for a turbine engine is disclosed. The cooling system includes a heat exchanger in fluid communication with a first fluid inlet stream and disposed upstream and in fluid communication with a core engine. The heat exchanger is operative to cool the first fluid inlet stream. The heat exchanger including a heat exchanger inlet for input of a heat exchanging medium for exchange of heat from the first fluid inlet stream to the heat exchanging medium and a heat exchanger outlet for discharge of a heated output stream into one of a turbine of a downstream engine, an augmentor or a combustor of a core engine.

In accordance with another embodiment, a turbine engine including a cooling system is disclosed. The turbine engine includes a core engine, a bypass flow turbomachine and an inlet heat exchanger. The core engine includes an intake side and an exhaust side, and is configured to receive a first fluid stream and discharge an exhaust flow stream. The bypass flow turbomachine is disposed to receive a second fluid stream and the exhaust flow stream from the core engine and discharge an exhaust flow stream. The bypass flow turbomachine includes an augmentor. The inlet heat exchanger is in fluid communication with the first fluid stream and disposed upstream and in fluid communication with the core engine. The inlet heat exchanger is operative to cool the first fluid stream. The inlet heat exchanger includes a heat exchanger inlet and a heat exchanger outlet. The heat exchanger inlet provides input of a heat exchanging medium for exchange of heat from the first fluid stream to the heat exchanging medium. The heat exchanging medium is at least one of water and fuel. The heat exchanger outlet provides discharge of a heated output stream, wherein the heated output stream is at least one of steam, a fuel and a reformed gaseous fuel. At least a portion of the heated output stream is output to at least one of a turbine of the bypass flow turbomachine, an injector of the augmentor and a combustor of the core engine.

DRAWINGS

These and other features and aspects of embodiments of the present invention will become better understood when the following detailed description is read with reference to the accompanying drawings in which like characters represent like parts throughout the drawings, wherein.

FIG. is a diagrammatic illustration of an alternate embodiment of a high-speed propulsion system disposed in a vehicle, according to one or more embodiments shown or described herein.

DETAILED DESCRIPTION

Embodiments of the present invention relate to a high speed propulsion system including inlet cooling in a turbine engine. As used herein, high speed propulsion system is applicable to various types of turbomachinery applications such as, but not limited to, turbojets, turbo fans, turbo propulsion engines, aircraft engines, gas turbines, steam turbines and compressors. In addition, as used herein, singular forms such as "a", "an", and "the" include plural referents unless the context clearly dictates otherwise. One or more specific embodiments of the present disclosure will be described below. In an effort to provide a concise description of these embodiments, not all features of an actual implementation are described in the specification.

Figure 1:
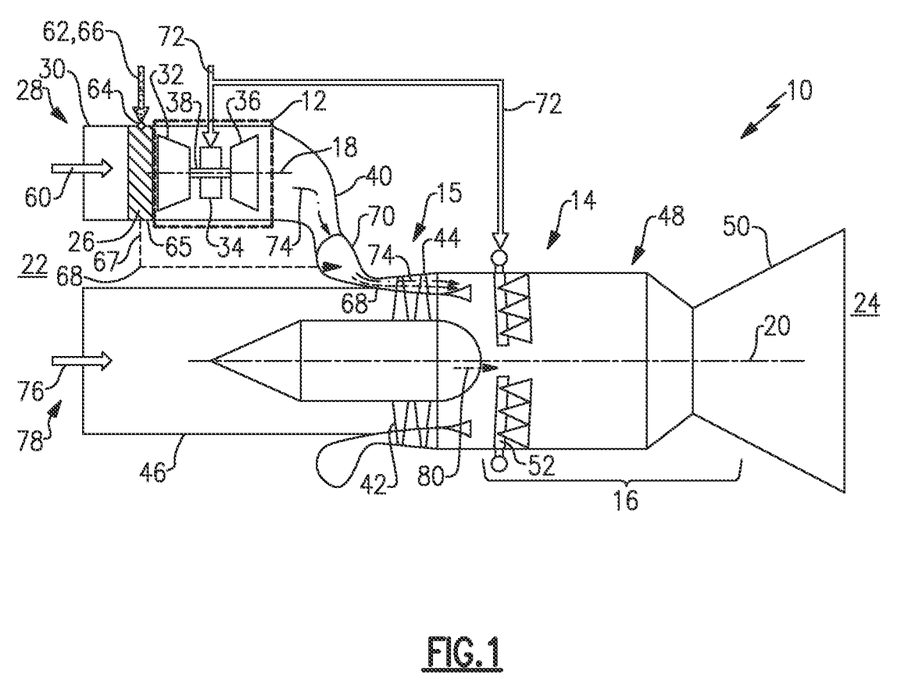
FIG. 1 is a diagrammatic illustration of a portion of a high-speed propulsion system, according to one or more embodiments shown or described herein.

Referring now to the drawings, in which like numerals refer to like elements throughout the several views, FIG. 1 is a schematic illustration of a turbine engine including a cooling system, and more particularly, an exemplary high-altitude, high-speed propulsion system 10 in accordance with the present disclosure. The present disclosure describes a high-altitude, high propulsion system wherein the term "high-altitude" is intended to indicate operational at altitudes greater than approximately 50,000 feet. In addition, the term "high-propulsion" is intended to indicate operational at speeds in excess of approximately Mach 2.5.

The high-speed propulsion system 10, as illustrated, includes a core engine 12, configured for operation at near sea-level inlet conditions and a bypass flow turbomachine 14, such as a stacked-annular compressor-turbine rotor system (SACTRS) 15, disposed downstream of the core engine 12. In an embodiment, the bypass flow turbomachine 14 includes an augmentor 16. Reference numeral 18 may be representative of a centerline axis of the core engine 12 and reference numeral 20 may be representative of a centerline axis of the bypass flow turbomachine 14. The engine assembly 10 further includes an intake side 22 and an exhaust side 24. An inlet heat exchanger 26 is disposed upstream and at an inlet 28 of the core engine 12. An inlet isolator 30 is disposed upstream of the inlet heat exchanger 26, so as to sandwich the heat exchanger 26 therebetween the inlet isolator 30 and the core engine 12.

In the exemplary embodiment, the core engine 12 includes, in serial downstream flow communication, a multistage axial high-pressure compressor 32, an annular combustor 34, and a high-pressure turbine 36 suitably joined to the multistage axial high-pressure compressor 32 by a high-pressure drive shaft 38. The high-pressure turbine 36 includes a plurality of rotating components, and more specifically rotor blades and a plurality of stationary components, and more specifically stators. The core engine 12 further includes an exhaust duct 40 in fluid communication with the bypass flow turbomachine 14.

The bypass flow turbomachine 14 includes a high-pressure compressor 42 and a high-pressure turbine 44. An inlet isolator 46 is disposed upstream of the high-pressure compressor 42. During operation, hot core gases (described presently) are discharged into an exhaust section 48 of the engine 10 that includes the augmenter, or afterburner, 16 from which they are discharged from the engine 10 through a variable ratio converging-diverging exhaust nozzle 50.

In an embodiment, augmentor 16 includes fuel injectors (such as spraybars or v-gutters) and flameholders, generally referenced 52, that are mounted between the turbines 44 and the exhaust nozzle 50 for injecting additional fuel during reheat operations. The injection of additional fuel provides burning in the augmentor 16 and produces additional thrust. Thrust augmentation or reheat using such fuel injection is referred to as wet operation, while operating dry refers to operation conditions where thrust augmentation is not used.

In the embodiment illustrated in FIG. 1, during operation, a first fluid stream 60 is input at inlet 28, and more particularly via isolator 30. The compressor 32 compresses the first fluid stream 60 entering the high-speed propulsion system 10 through the intake side 22. A heat exchanging medium 62, such as water or fuel, is input into an inlet 64 of the inlet heat exchanger 26. In this particular embodiment, the heat exchanging medium 62 is water 66. After passage through the heat exchanger 26, a resulting heated output stream 67 is output via an outlet 65 and injected into the downstream turbine stages 44 to increase power output. In this particular embodiment, the resulting heated output stream 67 is an output flow of steam, and more particularly a superheated steam 68. In an embodiment, the superheated steam 68 may supply approximately 600 shp, thereby boosting the turbine work by approximately 30%. As best illustrated in FIG. 1, in a preferred embodiment, the superheated steam 68 is injected into a collector, such as a volute, 70 and ducted to the turbines 44. In this particular embodiment, an input fuel stream 72 is split, with a portion injected into combustor 34 of the core engine 12 and a portion injected into the augmentor 16 via the fuel injectors 52. During operation, the first fluid stream 60 is compressed by the high-pressure compressor 32 and is delivered to the combustor 34. Moreover, the combusted airflow from the combustor 32 drives the rotating high-pressure turbine 36 and exits the core engine 12 as an exhaust flow stream 74. The exhaust flow stream 74 is ducted via the exhaust duct 40 to the turbines 44 of the bypass flow turbomachine 14 and drives the turbines 44.

In addition, a second fluid stream 76 is input at an inlet 78 of the bypass flow turbomachine 14, via the inlet isolator 46. The compressor 42 draws air from the second fluid stream 76 and compresses the fluid that is ultimately exhausted from the bypass flow turbomachine 14 as a secondary exhaust flow stream 80. The secondary exhaust flow stream 80 is fed to the augmentor 16. In the illustrated augmentor configuration, core exhaust gases 74 and fuel 72 from the fuel injectors 52 is ignited and combusted in the augmentor 16 prior to discharge through the exhaust nozzle 50.

The high speed propulsion system 10 as disclosed herein is configured to operate in various modes dependent upon flight conditions. In the embodiment illustrated in FIG. 1, at low altitude and low speed conditions, typically below approximately 30,000 ft., the augmentor 16 would not be functional and the inlet heat exchanger 26 would be bypassed. As the vehicle is accelerated, the augmentor 16 would be utilized. At very high speeds, typically in excess of approximately Mach 2.5, the inlet heat exchanger 26 would be utilized to lower an inlet temperature of the core engine and provide and increase in power output of the turbines 44.

Figure 2:
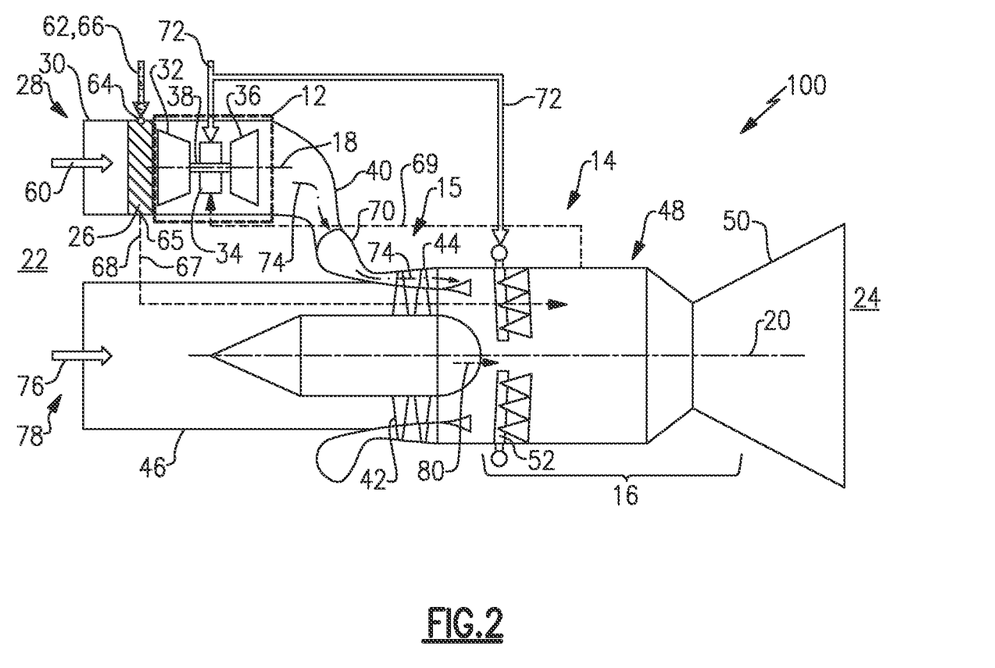
FIG. 2 is a diagrammatic illustration of a portion of an alternate embodiment of a high-speed propulsion system, according to one or more embodiments shown or described herein.

Referring now to FIG. 2, illustrated is an alternate embodiment of the high-speed propulsion system according to the disclosure. More specifically, illustrated is a high speed propulsion system 100, similar to the high speed propulsion system 10 of FIG. 1, including the use of water as a heat exchanging medium 62. It should be understood that like elements have like numbers throughout the embodiment.

In the embodiment illustrated in FIG. 2, during operation, a first fluid stream 60 is input at inlet 28, and more particularly via isolator 30. The compressor 32 compresses the first fluid stream 60 entering the high-speed propulsion system 10 through the intake side 22. A heat exchanging medium 62, and more specifically water 66, is input into an inlet 64 of the inlet heat exchanger 26. After passage through the heat exchanger 26, a resulting heated output stream 67 is output via an outlet 65 for use in the augmenter 16 to cool the augmentor. In this particular embodiment, the resulting heated output stream 67 is an output flow of superheated steam 68. Subsequently, a return stream, and more particularly an augmentor cooling stream 69, raised to a suitable temperature (up to 2500 R) in the augmenter 16, is injected into the combustor 34 of the core engine 12 where it offsets fuel consumption by up to approximately 40%. In addition, use of the superheated steam 68 in the core engine 12 would also reap the aforementioned work benefits in the bypass flow turbomachine.

Figure 3:
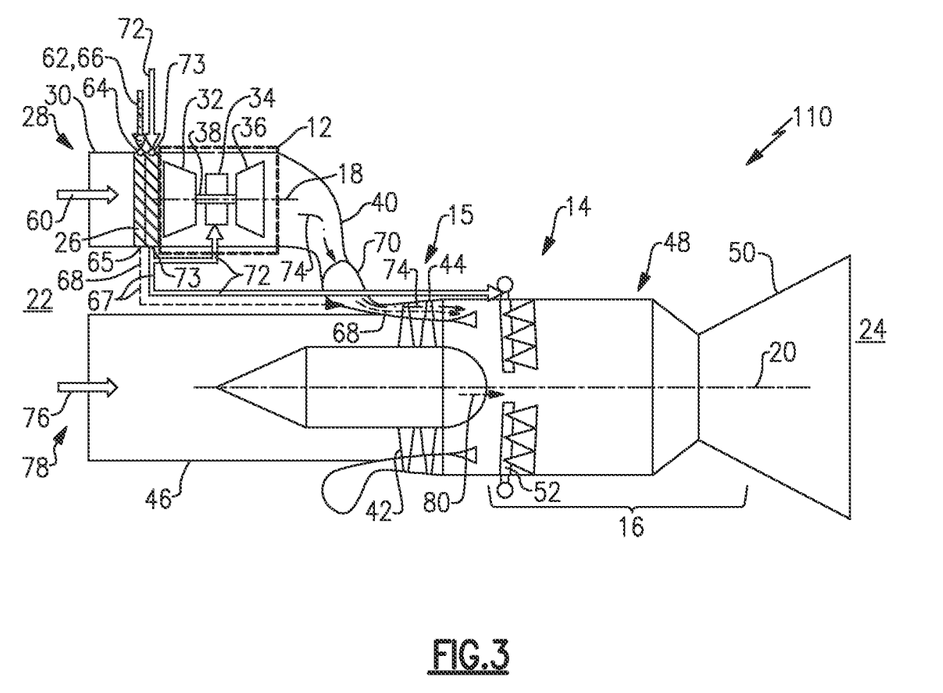
FIG. 3 is a diagrammatic illustration of a portion of an alternate embodiment of a high-speed propulsion system, according to one or more embodiments shown or described herein.
Figure 4:
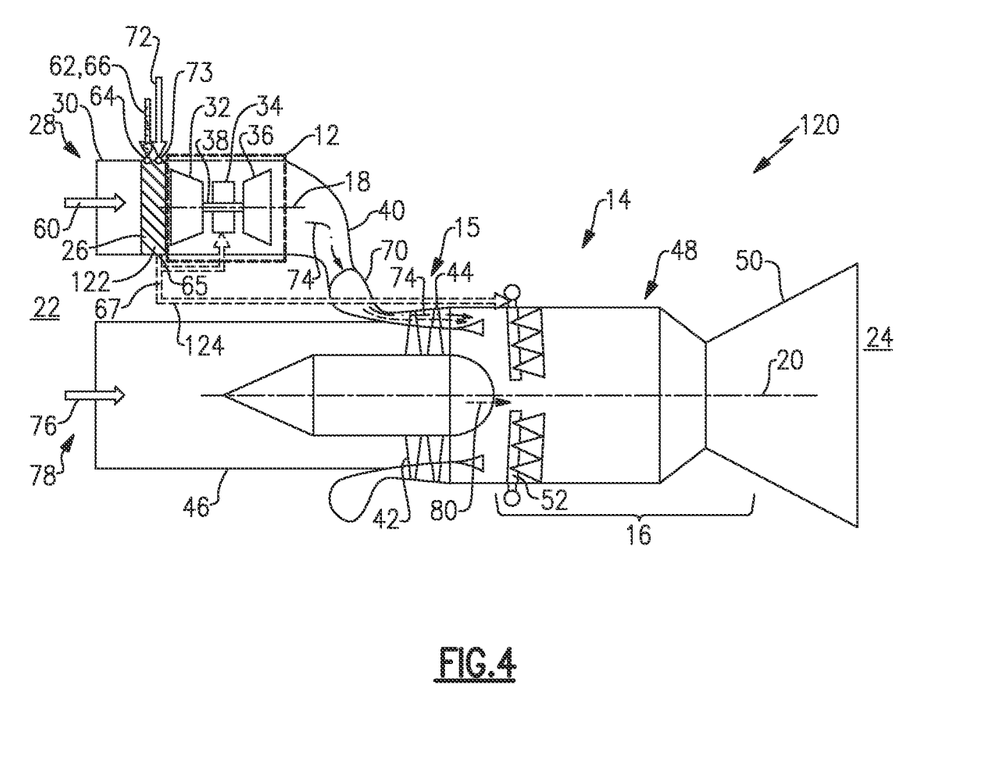
FIG. 4 is a diagrammatic illustration of a portion of an alternate embodiment of a high-speed propulsion system, according to one or more embodiments shown or described herein.

Referring now to FIGS. 3 and 4, illustrated are alternate embodiments of the high-speed propulsion system according to the disclosure in which fuel is used, in addition to, or in lieu of, water as the heat exchanging medium 62. Referring more specifically to FIG. 3, illustrated is a high speed propulsion system 110, similar to the high speed propulsion systems 10 and 100 of FIGS. 1 and 2, respectively. In this particular embodiment, fuel 72 is utilized, in addition to the use of water 66, as a heat exchanging medium 62. It should be understood that like elements have like numbers throughout the embodiment.

In the embodiment illustrated in FIG. 3, during operation, a first fluid stream 60 is input at inlet 28, and more particularly via isolator 30. The compressor 32 compresses the first fluid stream 60 entering the high-speed propulsion system 10 through the intake side 22. A heat exchanging medium 62, and more specifically water 66 and fuel 72, are input into an inlet 64 and inlet 73, respectively, of the inlet heat exchanger 26. In one specific configuration, the fuel 72 is input in a separate circuit of the heat exchanger 26. During operation the fuel 72 is heated in the inlet heat exchanger 25 to a temperature below its coking limit, thus offsetting the required flow of water 66. After passage through the heat exchanger 26, a resulting heated output stream 67 is output via an outlet 65 and injected into the downstream turbine stages 44 to increase power output. In this particular embodiment, the resulting heated output stream 67 includes an output flow of superheated steam 68. As best illustrated in FIG. 3, in a preferred embodiment, the superheated steam 68 is injected into a collector, such as a volute, 70 and ducted to the turbines 44. In addition, the input fuel stream 72, after passage through the heat exchanger 26, is output via an outlet 73 as a split stream with a portion injected into combustor 34 of the core engine 12 and a portion injected into the augmentor 16 via the fuel injectors 52. Accordingly, in this particular embodiment, the resulting heated output stream 67 includes an output flow of superheated steam 68 and an output flow of fuel 72. During operation, the first fluid stream 60 is compressed by the high-pressure compressor 32 and is delivered to the combustor 34. Moreover, the compressed airflow from the combustor 32 drives the rotating high-pressure turbine 36 and exits the core engine 12 as an exhaust flow stream 74. The exhaust flow stream 74 is ducted via the exhaust duct 40 to the turbines 44 of the bypass flow turbomachine 14 and drives the turbines 44. In an embodiment, use of the superheated steam 68 in the core engine 12 would provide work benefits in the bypass flow turbomachine.

Alternatively, or in addition to, after passage through the heat exchanger 26, the resulting flow of superheated steam 68 may be used in the augmenter 16 to cool the augmentor components as previously described with regard to FIG. 2. Subsequently, the superheated steam 68, raised to a suitable temperature (~2500 R) in the augmenter 16, is injected into the combustor 34 of the core engine 12 where it offsets fuel consumption by up to approximately 40%.

Referring now to FIG. 4, illustrated is a high speed propulsion system 120, similar to the high speed propulsion systems 10, 100 and 110 of FIGS. 1-3, respectively. In this particular embodiment, high speed propulsion system 120 is configured to perform steam reforming of an input fuel 72 to improve the cooling capacity of the heat exchanger 26, in addition to the use of water 66, as a heat exchanging medium 62. It should be understood that like elements have like numbers throughout the embodiment.

In the embodiment illustrated in FIG. 4, a hydrocarbon fuel 72, when combined with steam formed by the water 66 in the heat exchanger 26, and in the presence of a catalyst at high temperature, will form carbon monoxide and hydrogen. The process is endothermic and would thus serve to further improve the cooling capacity of the heat exchanger 26. The combustor 34 of the core engine 12 and the augmentor 16 are designed to make use of the reformed, gaseous fuel 124.

In the embodiment illustrated in FIG. 4, during operation, a first fluid stream 60 is input at inlet 28, and more particularly via isolator 30. The compressor 32 compresses the first fluid stream 60 entering the high-speed propulsion system 10 through the intake side 22. A heat exchanging medium 62, and more specifically water 66 and fuel 72, are input into an inlet 64 and inlet 73, respectively, of the inlet heat exchanger 26. A catalyst 122 contained within the heat exchanger 26, in combination with steam formed by the water 66 within the heat exchanger 26, provides steam reforming of the fuel 72. After passage through the heat exchanger 26, a resulting heated output stream 67 is output via an outlet 65. In this particular embodiment, the resulting heated output stream 67 is output as a flow of reformed gaseous fuel 124 that is split, with a portion injected into combustor 34 of the core engine 12 and a portion injected into the augmentor 16 via the fuel injectors 52.

During operation, the first fluid stream 60 is compressed by the high-pressure compressor 32 and is delivered to the combustor 34. Moreover, the compressed airflow from the combustor 32 drives the rotating high-pressure turbine 36 and exits the core engine 12 as an exhaust flow stream 74. The exhaust flow stream 74 is ducted via the exhaust duct 40 to the turbines 44 of the bypass flow turbomachine 14 and drives the turbines 44.

Alternate fuels such as liquid natural gas (LNG) or thermally stabilized liquid fuels may be considered for the heat exchanging medium 62 for use in the high-speed propulsion system disclosed herein. In an embodiment, storage for the LNG may be included. During operation the LNG would be vaporized and heated in the inlet heat exchanger 26 and delivered to the two combustion systems in a gaseous state. As compared to jet fuel, LNG has a much higher sensible heat sink potential as it must first undergo the process of vaporization (latent heat of vaporization ~200 Btu/lbm) and it can be heated to a high temperature (up to almost 2000 R) without breaking down. While LNG has a slightly lower volume-specific energy density than jet fuel, its potential as a heat sink in the heat exchanger 26 may provide an overall system benefit. In addition, fuel reformation may also be included in a high-speed propulsion system including an LNG fuel system. Thermally stabilized liquid fuels may also be considered. For example, JP-900 jet fuel, a coal-based liquid fuel developed by the Energy Institute of Pennsylvania State University (Penn State), has been found thermally stable at temperatures up to 1350 R.

Figure 5:
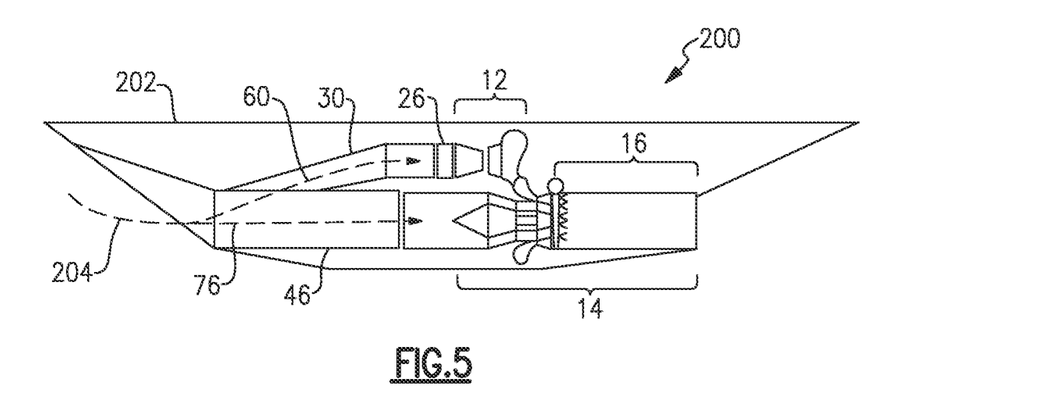
FIG. 5 is a diagrammatic illustration of a high-speed propulsion system disposed in a vehicle, according to one or more embodiments shown or described herein.

Referring now to FIGS. 5-9, illustrated are alternate embodiments for disposing the high-speed propulsion system as disclosed in a vehicle. More specifically, illustrated in FIG. 5 is a high speed propulsion system 200, such as high speed propulsion system 10, 100, 110 or 120 of FIGS. 1-4, disposed in a vehicle 202, such as an aircraft. In this particular embodiment, the high speed propulsion system 200 is configured to split an incoming fluid stream 204, with a portion directed to a heat exchanger 26 and a core engine 12, via an isolator 30, as a first fluid stream 60 and a portion directed to a bypass flow turbomachine 14 including an augmentor 16, via an isolator 46, as a second fluid stream 76.

Figure 6:
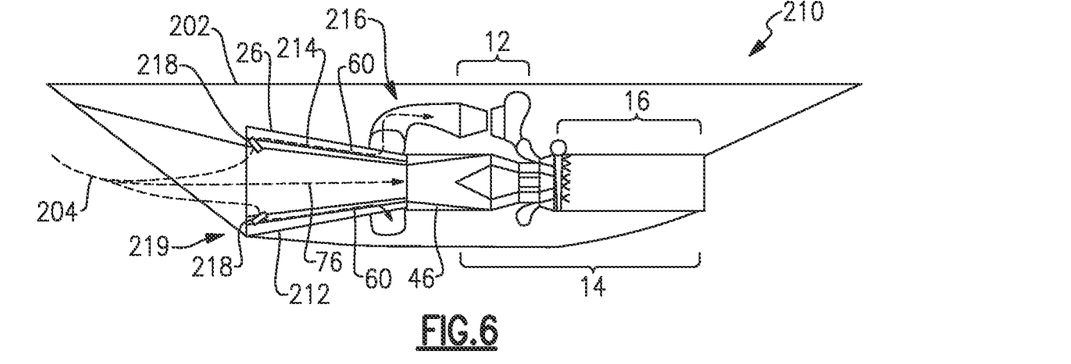

FIG. 6 illustrates another configuration of a high speed propulsion system 200, such as high speed propulsion system 10, 100, 110 or 120 of FIGS. 1-4, disposed in a vehicle 202. As illustrated, the high speed propulsion system 210 is configured to split an incoming fluid stream 204, with a portion directed to a heat exchanger 26 and a core engine 12 as a first fluid stream 60 and a portion directed to a bypass flow turbomachine 14, including an augmentor 16, as a second fluid stream 76. In this particular embodiment, the an isolator 212, generally similar to isolator 46 of FIG. 1, is configured to include the heat exchanger 26 with a boundary layer flow 214 of the incoming fluid stream 204 being drawn into the heat exchanger 26, and passing therethrough into an inlet 216 of the core engine 12. The boundary layer is sucked out of the main flow and through the heat exchanger 26 resulting in improved pressure recovery in the isolator 212 for the bypass flow turbomachine 14. The result is improved overall engine performance. In an embodiment, optional flaps 218 at a leading end 219 of the heat exchanger 26 may be included to permit the air flow into the core engine 12 at low Mach numbers, so as to bypass the heat exchanger 26.

Figure 7:
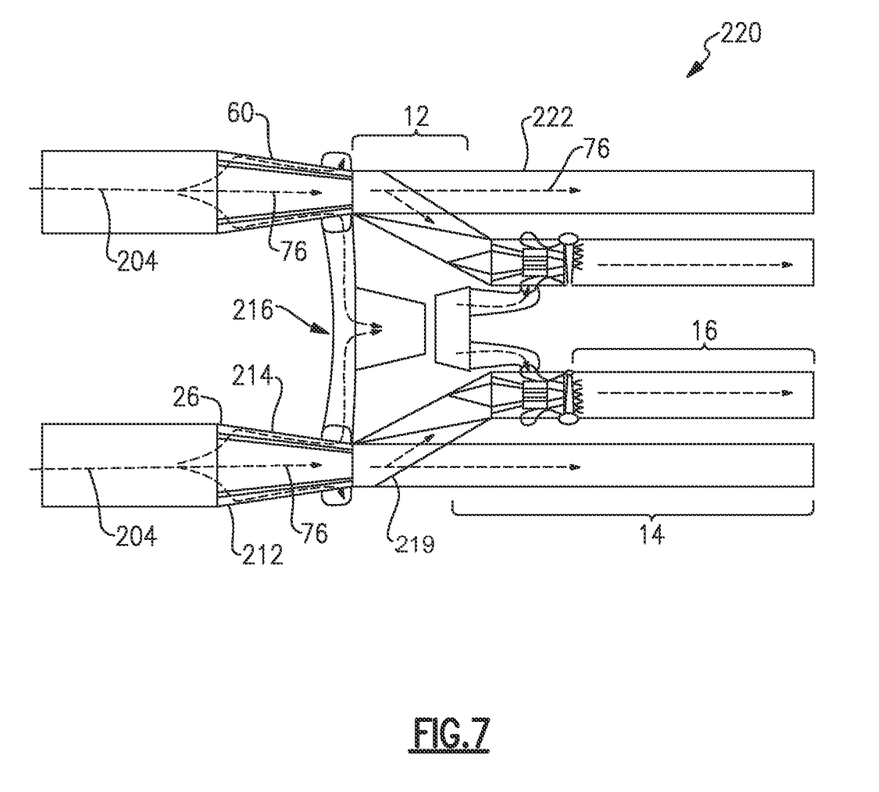
FIG. 7 is a diagrammatic illustration of a high-speed propulsion system including a scramjet, according to one or more embodiments shown or described herein.

Referring now to FIG. 7, illustrated is another configuration of a high speed propulsion system 220, such as high speed propulsion system 10, 100, 110 or 120 of FIGS. 1-4, disposed in a vehicle (not shown). As illustrated, the high speed propulsion system 220 is configured to split an incoming fluid stream 204, with a portion directed to a heat exchanger 26 and a core engine 12 as a first fluid stream 60 and a portion directed to a bypass flow turbomachine 14, including an augmentor 16, as a second fluid stream 76 or toward a scramjet 222 disposed about core engine 12 and the a bypass flow turbomachine 14. One or more flaps 219 are provided to direct the second fluid stream 76 toward the bypass flow turbomachine 14 or the scramjet 222 dependent upon power need. Similar to the previous embodiment, an isolator 212, generally similar to isolator 46 of FIG. 1, is configured to include the heat exchanger 26 with a boundary layer flow 214 of the incoming fluid stream 204 being drawn into the heat exchanger 26, and passing therethrough into an inlet 216 of the core engine 12.

Figure 8:
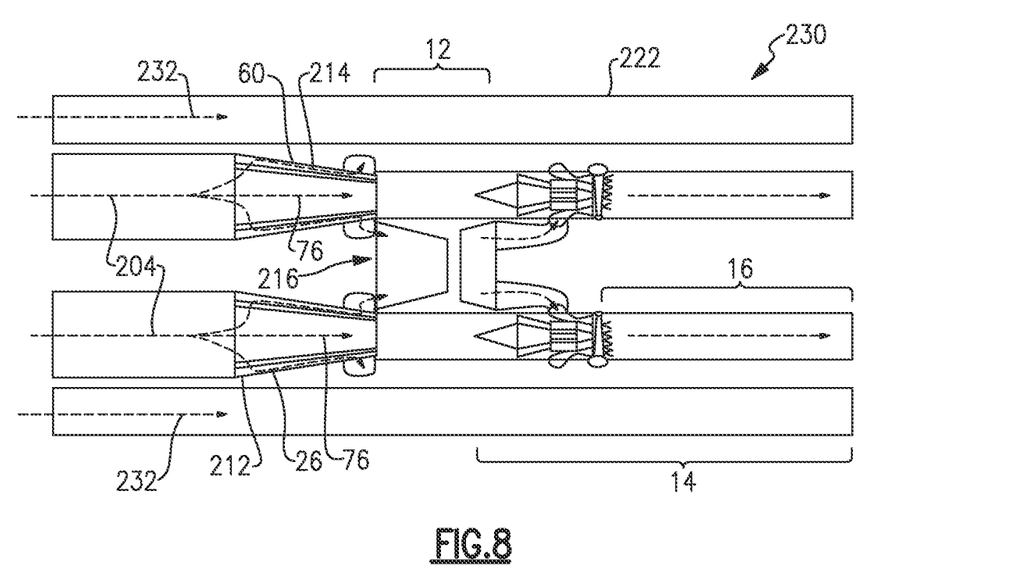
FIG. 8 is a diagrammatic illustration of an alternate embodiment of high-speed propulsion system including a scramjet, according to one or more embodiments shown or described herein.

Referring now to FIG. 8, illustrated is another configuration of a high speed propulsion system 230, such as high speed propulsion system 10, 100, 110 or 120 of FIGS. 1-4, disposed in a vehicle (not shown). Similar to the embodiment of FIG. 7, the high speed propulsion system 230 is configured to split an incoming fluid stream 204, with a portion directed to a heat exchanger 26 and a core engine 12 as a first fluid stream 60 and a portion directed to a bypass flow turbomachine 14, including an augmentor 16, as a second fluid stream 76. In addition, a separate incoming fluid stream 232 is directed toward a scramjet 222 disposed about the core engine 12 and the bypass flow turbomachine 14. Similar to the embodiment described with regard to FIG. 6, in an embodiment, optional flaps (not shown) at a leading end of the heat exchanger 26 may be included to permit the air flow into the bypass flow turbomachine 14 at low Mach numbers, so as to bypass the heat exchanger 26. Similar to the previous embodiment, an isolator 212, generally similar to isolator 46 of FIG. 1, is configured to include the heat exchanger 26 with a boundary layer flow 214 of the incoming fluid stream 204 being drawn into the heat exchanger 26, and passing therethrough into an inlet 216 of the core engine 12.

Figure 9:
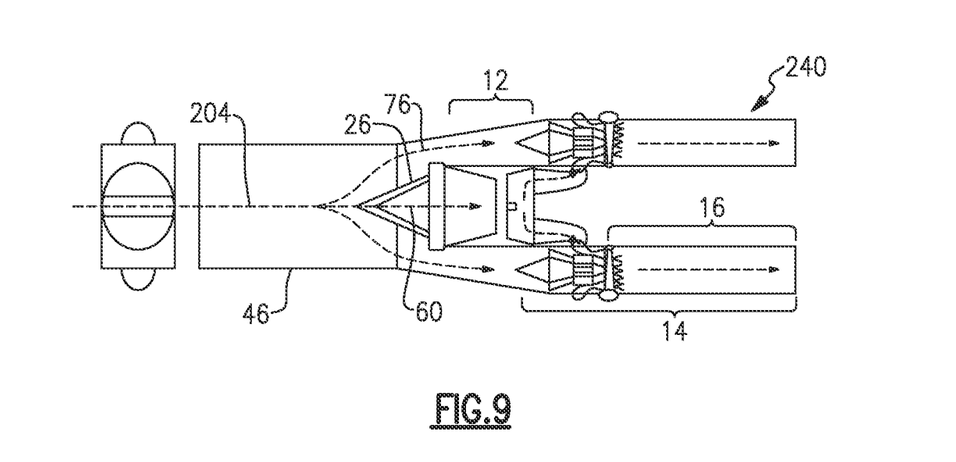
FIG. 9 is a diagrammatic illustration of an alternate embodiment of high-speed propulsion system, according to one or more embodiments shown or described herein.

FIG. 9 illustrates yet another configuration of a high speed propulsion system 240, such as high speed propulsion system 10, 100, 110 or 120 of FIGS. 1-4, disposed in a vehicle (not shown). In contrast to the previous embodiments of FIG. 5-8, the high speed propulsion system 240 is configured to split an incoming fluid stream 204, with a portion directed to a heat exchanger 26 and a core engine 12 as a first fluid stream 60 and a portion directed to a bypass flow turbomachine 14, including an augmentor 16, as a second fluid stream 76. In this particular embodiment, the heat exchanger 26 is centrally disposed and in alignment with the core engine 12. The bypass flow turbomachine 14 is disposed about the core engine 12.

Accordingly, disclosed herein is a high speed propulsion system that provides inlet cooling, while minimizing stagnation conditions at the inlet. The disclosed system minimizes development and unit costs by leveraging existing engine technology while providing a novel solution for high-speed flight. In addition, new advances in technology, and in particular additive manufacturing techniques, such as direct metal laser melting (DMLM), allow for fabrication of intricate geometries, in particular with respect to heat exchanger designs, for use in the disclosed high speed propulsion system. In addition, lightweight, high-flux heat exchangers with very thin-walled tubing are anticipated for use in the high speed propulsion system as disclosed herein.

It is to be understood that not necessarily all such objects or advantages described above may be achieved in accordance with any particular embodiment. Thus, for example, those skilled in the art will recognize that the systems and techniques described herein may be embodied or carried out in a manner that achieves or improves one advantage or group of advantages as taught herein without necessarily achieving other objects or advantages as may be taught or suggested herein.

While the technology has been described in detail in connection with only a limited number of embodiments, it should be readily understood that the specification is not limited to such disclosed embodiments. Rather, the technology can be modified to incorporate any number of variations, alterations, substitutions or equivalent arrangements not heretofore described, but which are commensurate with the spirit and scope of the claims. Additionally, while various embodiments of the technology have been described, it is to be understood that aspects of the specification may include only some of the described embodiments. Accordingly, the specification is not to be seen as limited by the foregoing description, but is only limited by the scope of the appended claims. What is claimed as new and desired to be protected by Letters Patent of the United States is:

The invention claimed is:

1. A turbine engine including a cooling system, the turbine engine comprising:
   a core engine comprising an intake side and an exhaust side, the core engine configured to receive a first fluid stream and discharge a primary exhaust flow stream, the core engine comprising a compressor, a combustor, and a turbine;
   a bypass flow turbomachine comprising a plurality of rotor blades, an inboard portion of the plurality of rotor blades defining a bypass flow turbomachine compressor disposed to receive a second fluid stream and an outboard portion of the plurality of rotor blades defining a plurality of turbine stages disposed to receive the primary exhaust flow stream from the core engine and discharge a secondary exhaust flow stream, the bypass flow turbomachine including an augmentor; and
   an inlet heat exchanger in fluid communication with the first fluid stream and disposed upstream and in fluid communication with the core engine, the inlet heat exchanger operative to cool the first fluid stream, the inlet heat exchanger comprising:
      a heat exchanger inlet for input of a heat exchanging medium for exchange of heat from the first fluid stream to the heat exchanging medium; and
      a heat exchanger outlet for discharge of a heated output stream, wherein the heated output stream comprises steam, and wherein the steam bypasses the compressor, the combustor, and the turbine of the core engine and provides an additional flow into the bypass flow turbomachine.

2. The turbine engine of claim 1, wherein the heat exchanging medium is comprised of at least one of water or of water and fuel.

3. The turbine engine of claim 2, wherein the fuel is at least one of a liquid natural gas and a thermally stabilized liquid fuel.

4. The turbine engine of claim 2, wherein at least a portion of the heated output stream is output to at least one of the plurality of turbine stages of the bypass flow turbomachine, an injector of the augmentor and the combustor of the core engine.

5. The turbine engine of claim 1, wherein the steam from the heat exchanger outlet of the inlet heat exchanger merges with the primary exhaust flow stream from the core engine at a location downstream of the turbine of the core engine.

6. A cooling system for a turbine engine, the turbine engine comprising a core engine and a bypass flow turbomachine, the core engine having a compressor, a combustor, and a turbine and the bypass flow turbomachine having a plurality of rotor blades, the plurality of rotor blades having an inboard portion defining a bypass flow turbomachine compressor and an outboard portion defining a bypass flow turbomachine turbine, the cooling system comprising:
   a heat exchanger in fluid communication with a first fluid inlet stream and disposed upstream and in fluid communication with the core engine, the heat exchanger operative to cool the first fluid inlet stream, the heat exchanger comprising:
      a heat exchanger inlet for input of a heat exchanging medium for exchange of heat from the first fluid inlet stream to the heat exchanging medium; and
      a heat exchanger outlet for discharge of a heated output stream onto an the outboard portion of the plurality of rotor blades of the bypass flow turbomachine, wherein the heated output stream comprises steam, the plurality of rotor blades defining a plurality of turbine stages of the bypass flow turbomachine turbine, whereby the steam bypasses the compressor, the combustor, and the turbine of the core engine and provides an additional flow to the bypass flow turbomachine.

7. The cooling system of claim 6, wherein the heat exchanging medium is comprised of at least one of water or of water and fuel.

8. A turbine engine including a cooling system, the turbine engine comprising:
   a core engine comprising an intake side and an exhaust side, the core engine configured to receive a first fluid stream and discharge a primary exhaust flow stream, the core engine comprising a compressor, a combustor, and a turbine;
   a bypass flow turbomachine comprising a plurality of rotor blades, an inboard portion of the plurality of rotor blades defining a bypass flow turbomachine compressor disposed to receive a second fluid stream and an outboard portion of the plurality of rotor blades defining a plurality of turbine stages disposed to receive the primary exhaust flow stream from the core engine and discharge a secondary exhaust flow stream, the bypass flow turbomachine including an augmentor; and
   an inlet heat exchanger in fluid communication with the first fluid stream and disposed upstream and in fluid communication with the core engine, the inlet heat exchanger operative to cool the first fluid stream, the inlet heat exchanger comprising:
      a heat exchanger inlet for input of a heat exchanging medium for exchange of heat from the first fluid stream to the heat exchanging medium; and
      a heat exchanger outlet for discharge of a heated output stream, wherein at least a portion of the heated output stream bypasses the compressor, the combustor, and the turbine of the core engine and is output to at least one of the plurality of turbine stages of the bypass flow turbomachine or an injector of the augmentor.

9. The turbine engine of claim 8, wherein the heat exchanging medium is at least one of water or water and fuel, wherein the heated output stream comprises steam.

10. The turbine engine of claim 8, wherein the portion of the heated output stream from the heat exchanger outlet of the inlet heat exchanger merges with the primary exhaust flow stream from the core engine at a location downstream of the turbine of the core engine.

* * * * *